United States Patent
Nykanen et al.

[19]

[11] Patent Number: 5,923,443
[45] Date of Patent: Jul. 13, 1999

[54] INFRARED COMMUNICATION PORT FAX SOFTWARE LEGACY FLOW CONTROL EMULATION

[75] Inventors: Petri Nykanen; Juhani Matto, both of Tampere, Finland

[73] Assignee: Nokia Mobile Phones Limited, Espoo, Finland

[21] Appl. No.: 08/784,079

[22] Filed: Jan. 15, 1997

Related U.S. Application Data

[60] Provisional application No. 60/009,953, Jan. 16, 1996.
[51] Int. Cl.$^6$ ..................................................... H04N 1/00
[52] U.S. Cl. ........................................... 358/442; 358/468
[58] Field of Search ..................................... 395/500, 828, 395/831, 834, 849; 358/442, 468

[56] References Cited

U.S. PATENT DOCUMENTS

| | | | |
|---|---|---|---|
| 5,546,211 | 8/1996 | Devon | 359/154 |
| 5,585,952 | 12/1996 | Imai et al. | 359/135 |
| 5,602,873 | 2/1997 | Balasubramanian et al. | 375/242 |
| 5,621,894 | 4/1997 | Menezes | 395/200.12 |
| 5,633,890 | 5/1997 | Ahmed | 375/219 |
| 5,737,107 | 4/1998 | Umeda | 359/146 |
| 5,784,559 | 6/1998 | Frazier et al. | 395/200.13 |

*Primary Examiner*—Lance Leonard Barry
*Attorney, Agent, or Firm*—Perman & Green, LLP

[57] ABSTRACT

A new functionality in a fax communication system including a PC with a virtual data port (DTE) and a fax modem (DCE), having an infrared (IR) connection between them, wherein the DCE is capable of indicating to the local infrared communications, i.e., IrDA IrCOMM, port or interface the type of the software flow control, either local or end-to-end, so that the local and the remote IrCOMM ports can be made to function such that:

| IF | an XON/XOFF character is received from the client AND the mode is end-to-end AND the SW flow control is enabled, |
|---|---|
| THEN | the XON/XOFF character is handled as flow control and the character is transmitted to the host IrCOMM. |

A new interface primitive at the interface of the IrCOMM in the DCE requests the desired mode and if the desired mode is "local", the XON/XOFF characters are not transmitted to the host system when SW flow control is active. When the mode is "end-to-end", then the XON/XOFF characters are always transmitted to the host system regardless of the SW flow control state. A new control channel parameter inside the local IrCOMM indicates the change of the SW flow control mode to report the change to the host IrCOMM.

12 Claims, 3 Drawing Sheets

INFRARED COMMUNICATION PORT FAX SOFTWARE LEGACY FLOW CONTROL EMULATION

CLAIM OF PRIORITY BASED ON CO-PENDING PROVISIONAL APPLICATION

The present application is related to co-pending Provisional patent application Ser. No. 60/009,953 of Petre Nykanen and Juhane Matto, filed Jan. 16, 1996, entitled "IrCOMM Fax Software Legacy Flow Control Emulation", and based on which priority is herewith claimed under 35 U.S.C. 119(e) and the disclosure of which is incorporated herein by reference in its entirety.

BACKGROUND OF THE INVENTION

1. Field of the Invention

The present invention relates to fax transmissions involving an IrDA protocol and, more particularly, to a method and means that enables a fax modem (DCE) to request a certain mode, local or end-to-end, from a PC having a virtual data port (DTE) with which the modem communicates over an IR connection when the fax class is made active, that is, when a fax is being received or is to be transmitted.

2. Prior Art

In a fax communication system including a PC with a virtual data port (DTE) and a fax modem (DCE), having an infrared (IR) connection between them, the latest IrDA IrCOMM specification calls for the software (SW) flow control signals (XON/XOFF characters) to be handled locally in the DTE or the DCE when the software flow control is enabled, so that no SW flow control signals are transmitted between the DTE and DCE. This feature is necessitated by the fact that if these characters were sent over the connection, they would have an effect on the local flow control emulation at the remote end which would cause a drop in the overall throughput over the IR connection and could also cause deadlocks or data to be lost. A problem is posed by this feature, however, with a PC using legacy, i.e., existing, fax software that operates under the assumption that the SW flow control characters are being transmitted between the DTE and DCE. Although this problem is not visible with existing RS-232 based implementations, because the SW flow control signals are not stripped and made local therein, it does arise in the virtual serial case where such stripping occurs.

Protocol layers in a DTE and DCE with the IrCOMM functionality are shown in FIG. 1. The various protocol layers inside the DTE and DCE are supposed to be transparent to the user of the virtual communications resource, but these layers, nevertheless, are not totally transparent. They can cause certain buffering related delays that may have negative effects on some protocols; for instance, they may cause some timing critical protocols to fail. This kind of problem is typical in re-transmission based systems and it appears there is not much that can be done to avoid these effects.

Problem to be Solved

Although these problem effects are inherent in systems with re-transmissions and an unreliable transmission medium, the problem caused by the IrCOMM specification not behaving the way that existing fax software assumes it does, is not inherent and needs a solution.

One possible solution might be to have the IrCOMM in the DTE parse AT-commands. However, this approach would require the IrCOMM to parse all the data given to it by the application program and to be able to detect when the fax class is activated or deactivated. Such requirements would essentially render this approach infeasible. Another solution might be to include an additional interface in the application to indicate that it has activated the fax class. The feasibility of this approach is questionable as it might not support the existing fax software since it would require that the activation of the fax class be reported by the fax application to the virtual port resource and it is not likely that operating system vendors would add this kind of functionality to their architectures.

A further solution might be to cause the IrCOMM in the DTE to always pass through the SW flow control signals, but this technique would not be efficient since the SW flow control signals (characters XON/XOFF) would cause end-to-end flow control which would have an effect on the throughput of the virtual communication port. The IrCOMMs that have service-to-service connection between them do have their own flow control mechanism, but this mechanism would become inefficient if the XON/XOFF characters were always transferred end-to-end when the software flow control is activated. There is also a risk that a deadlock situation might be caused if two non-independent flow control mechanisms are in use.

Object

It is therefore an object of the present invention to provide a method and means for solving the problem of the incompatability of the IrDA IrCOMM specification with existing fax software on PCs that operates under the assumption that the SW flow control characters are transmitted between the DTE and DCE.

SUMMARY OF THE INVENTION

The present invention involves a new functionality in a fax communication system including a PC with a virtual data port (DTE) and a fax modem (DCE), having an infrared (IR) connection between them, which functionality is based on the fact that when the fax class is enabled the XON/XOFF characters are handled as data and the DCE is capable of detecting the change in the internal state of the fax modem. Thus, if the DCE is given means to indicate to the local IrCOMM the type of the software flow control, either local or end-to-end, then the local and the remote IrCOMMs can be made to function in the following manner:

| | |
|---|---|
| IF | an XON/XOFF character is received from the client AND the mode is end-to-end AND the SW flow control is enabled, |
| THEN | the XON/XOFF character is handled as flow control and the character is transmitted to the host IrCOMM, | where the "local IrCOMM" is the IrCOMM of the particular device and the "remote IrCOMM" is the IrCOMM of the device which is in IR-connection with the particular device, and the "client" is the customer/user of the local IrCOMM and the "host IrCOMM" is the IrCOMM of the device which is in IR-connection as the host. For example, with the following component arrangement:

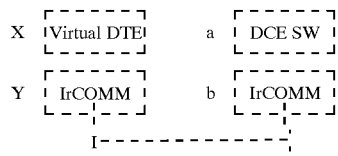

For Y: X is the client
a and b are remote
(a and b are the host)
b is the host IrCOMM According to the invention a new interface primitive is provided at the interface of the IrCOMM in the DCE to request the desired mode, i.e., IrCOMM_SW_flow_control_mode_set(local or end-to-end). If the desired mode is "local", the XON/XOFF characters are not transmitted to the host system when SW flow control is active. When the mode is "end-to-end", then the XON/XOFF characters are always transmitted to the host system regardless of the SW flow control state.

Inside the IrCOMM a new control channel parameter indicating the change of the SW flow control mode is required to report the change to the host IrCOMM and thus is provided. As the host IrCOMM is not supposed to check data incoming from the local IrCOMM, the XON/XOFF characters will be transmitted all the way to the client of the host IrCOMM.

Thus, the method and means of the invention enables the DTE side to support SW flow control as existing fax software supposes it to work. No special heuristics or AT-command parsing is required on the DTE side to determine when fax sending or receiving is enabled because the DCE is capable of determining this internally, and then the DCE reports the required change in flow control functionality to the DTE. The invention does require some changes in the DTE side software to function properly, e.g., the ability to decode the new control channel parameter, and based on the parameter, to change the functionality of the local block responsible for flow control, but such changes are within the purview of those of skill in the art given the description of the invention herein.

DETAILED DESCRIPTION OF THE PREFERRED EMBODIMENT

Figure 1:
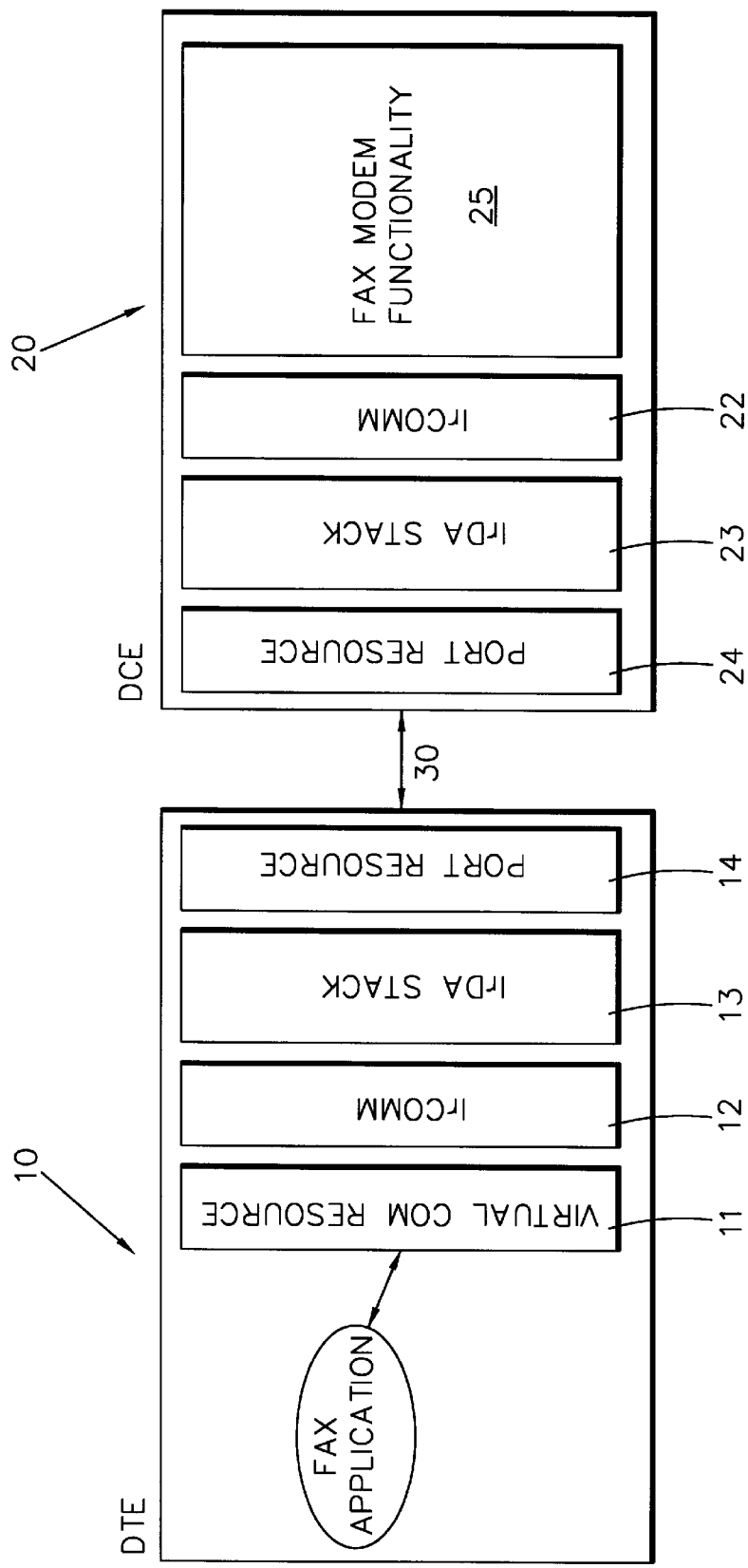
FIG. 1 illustrates a DTE and DCE combination with the IrCOMM functionality showing the various protocol layers inside the DTE and DCE.

The present invention is embodied in a method and means for handling fax transmissions involving an IrDA protocol and that enable a fax modem (DCE) to request a certain mode, local or end-to-end, from a PC with a virtual data port (DTE), communicating over an IR link with the DCE, when the fax class is made active, that is, when a fax is being received or is to be transmitted. FIG. 1 illustrates a suitable combination of a DTE 10 and a DCE 20 connected together with IrCOMM functionality by which the invention may be implemented. It will be seen that the DTE 10 has protocol layers for exchanging fax transmissions with the DCE 20 over an IR link 30. The DTE protocol layers include a fax application layer 11, i.e., Virtual COM Resources, an IrCOMM layer 12, an IrDA stack 13, and a Port Resource 14. Similarly, the DCE protocol layers include a Port Resource 24, an IrDA stack 23, and an IrCOMM layer 22 interfacing with the Fax Modem functionality 25.

Figure 2:
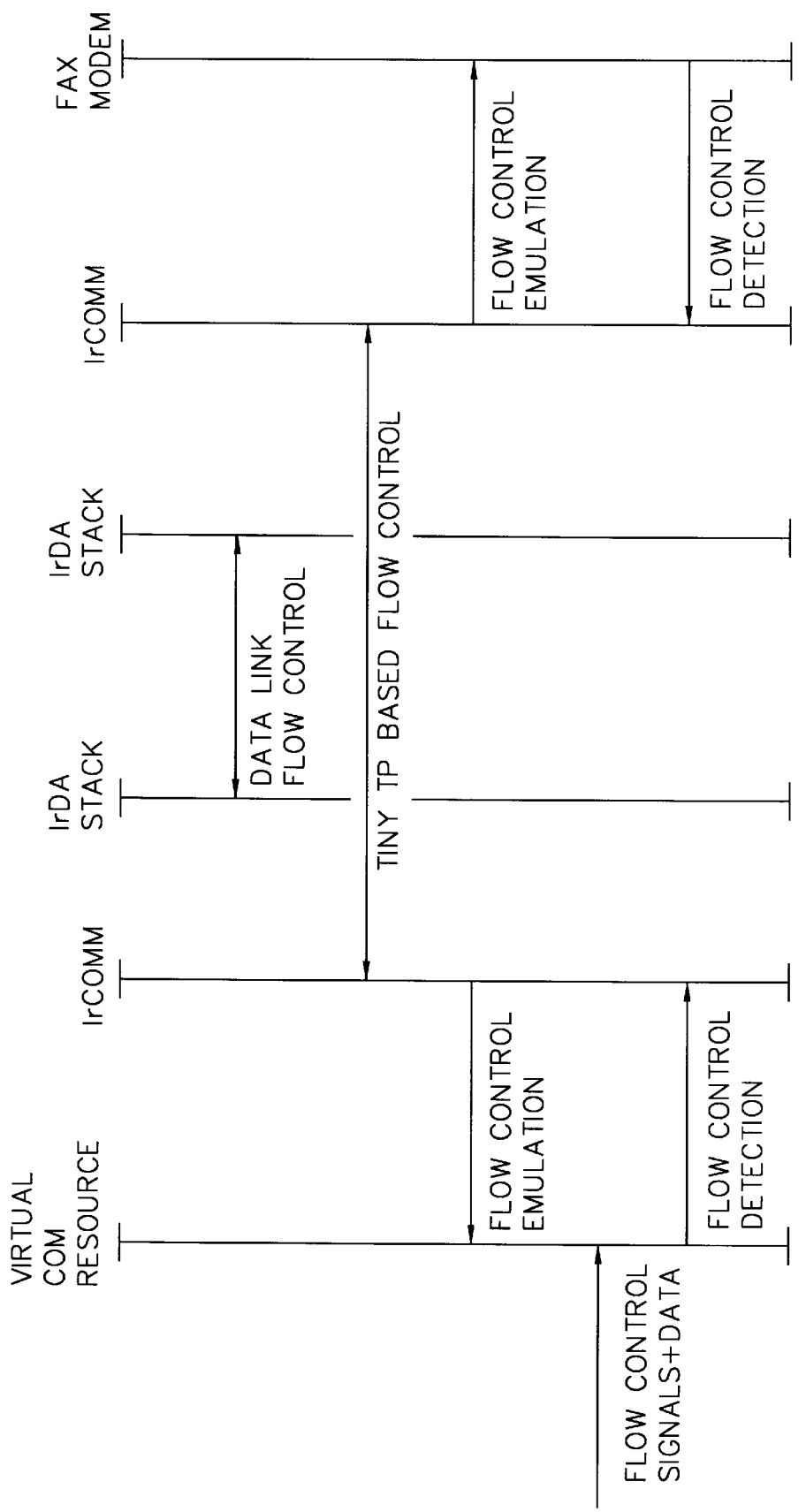
FIG. 2 illustrates the different flow control methods on different protocol layers.

The different flow control methods on different protocol layers are shown in FIG. 2. The data link layer 31, between the IrDA stacks, has its own flow control to ensure that it does not run out of buffers. The IrCOMM service connection relies on the flow control method specified in the IrDA TinyTP specification. The TinyTP controls the usage of buffers inside a service connection. Because this flow control exists, it is not efficient to let the local flow control methods at either end of the connection effect the flow control at the other end. In the illustrated arrangement it can be seen that at both ends of the IR connection the IrCOMM is responsible for emulating and detecting the flow control methods in effect. It might be noted that the flow control methods are software (SW) flow control (XON/XOFF characters) and hardware flow control (V.24 RTS/CTS signal based), which at any given time may be active alone, together, or not at all. The emulation for SW flow control is local. The SW flow control signals received by IrCOMM from its client (DTE or DCE) never directly effect flow control at the remote end. These signals can indirectly effect the flow control at the remote end by causing TinyTP buffers to fill when no data may be sent to the client by IrCOMM, and when the TinyTP runs out of buffers, it will indicate to the remote end that the station is in a busy state.

Figure 3:
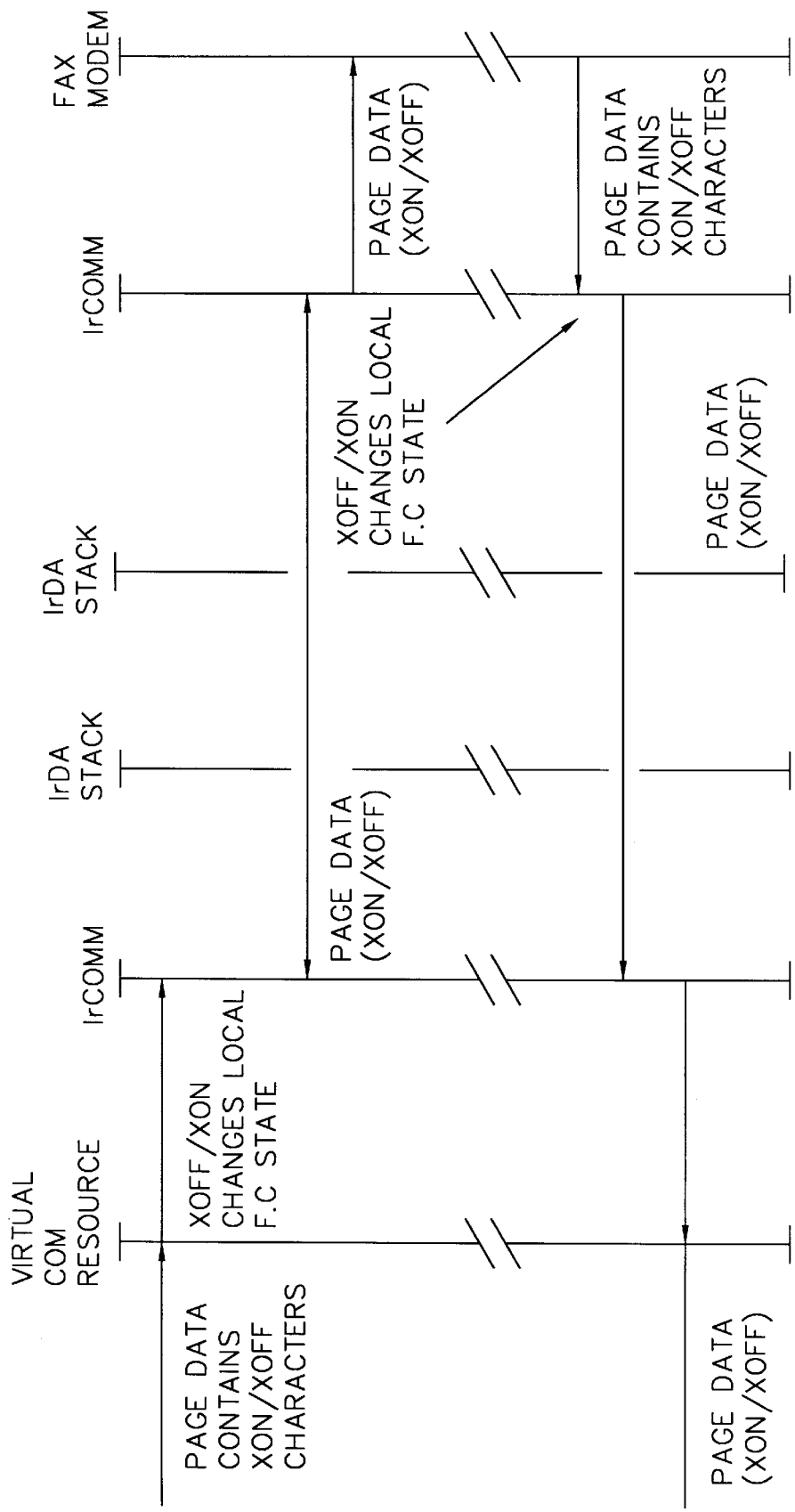
FIG. 3 illustrates the problem that occurs when sending a fax with software flow control enabled wherein the local IrCOMM in the DTE removes the XON/XOFF characters in the outgoing commands containing page binary image data so that the binary image data is lost.

The foregoing situation causes the problem that can be appreciated from the diagram in FIG. 3. FIG. 3 accordingly illustrates the problem that occurs when sending a fax with software flow control enabled wherein the local IrCOMM in the DTE removes the SW flow control XON/XOFF characters in the outgoing commands containing page binary image data so that the binary image data integrity is lost. The same effect happens when a fax is being received, i.e., the local IrCOMM in the DCE removes the XON/XOFF characters in the incoming commands containing the page binary image data. If the XON/XOFF characters are not removed, this may inadvertently activate flow control, thus causing a situation in which deadlock may occur.

The new functionality of the invention utilizes the fact that when the fax class is enabled the XON/XOFF characters are handled as data, and that the DCE is capable of detecting the change in the internal state of the fax modem. Thus, the DCE is given means to indicate, by a suitable signal, to the local IrCOMM the type of the software flow control, either local or end-to-end, and the local and the remote IrCOMMs can be made to function in the following manner:

| | |
|---|---|
| IF | an XON/XOFF character is received from the client AND the mode is end-to-end AND the SW flow control is enabled, |
| THEN | the XON/XOFF character is handled as flow control and the character is transmitted to the host IrCOMM. |

A new interface primitive is provided at the interface of the IrCOMM at the DCE to request the desired mode, i.e, IrCOMM_SW_flow_control_mode$_{13}$ set(local or end-to-end). If the desired mode is "local", the XON/XOFF characters are not transmitted to the host system when SW flow control is active. When the mode is "end-to-end", then the XON/XOFF characters are always transmitted to the host system regardless of the software flow control state.

Inside the IrCOMM a new control channel parameter indicating the change of the SW flow control mode is provided to report the change to the host IrCOMM. As the host IrCOMM is not supposed to check data incoming from the local IrCOMM, the XON/XOFF characters will be transmitted all the way to the client of the host IrCOMM.

Thus, a method and means in accordance with the invention has been disclosed for IrDA IrCOMM transmissions enabling the DTE side to support SW flow control as existing fax software supposes it to work, requiring no special heuristics or AT-command parsing on the DTE side to determine when fax sending or receiving is enabled since the DCE is capable of determining this internally, and then reporting the required change in flow control functionality to the DTE. While the invention requires some changes in the DTE side software for proper functioning, the necessary changes are within the purview of those of skill in the art given the description of the invention herein.

What is claimed is:

1. Apparatus for enabling a fax modem (DCE), having a local IrCOMM, to request a certain kind of mode from a PC, having a virtual data port (DTE) and a remote IrCOMM, with which said DCE communicates when the fax class is made active, comprising:

means, in the DCE, for producing a signal indicating to the local IrCOMM the type of the software flow control, either local or end-to-end, to be applied to software flowing when the fax class is made active; and means, in the local and the remote IrCOMMs and responsive to said indicating signal, for causing said IrCOMMs to function in the following manner:

IF an XON/XOFF character is received from the client AND the mode is end-to-end AND the SW flow control is enabled, THEN the XON/XOFF character is handled as flow control and the character is transmitted to the host IrCOMM.

2. An apparatus as in claim 1 further comprising:

an interface primitive at the interface of the IrCOMM at the DCE for requesting the desired mode, said primitive comprising:

IrCOMM_SW_flow_control_mode_set(local or end-to-end).

3. An apparatus as in claim 2 further comprising:

means, responsive to said indicating signal indicating that the desired mode is "local", for not transmitting the XON/XOFF characters to the host system when SW flow control is active; and means, responsive to said indicating signal indicating that the desired mode is "end-to-end", for transmitting the XON/XOFF characters to the host system regardless of the software flow control state.

4. An apparatus as in claim 1 further comprising:

a control channel parameter inside the local IrCOMM for indicating a change of the SW flow control mode to report the change to the host IrCOMM.

5. An apparatus as in claim 1 wherein said DTE has protocol layers comprising a fax application layer, an IrCOMM layer, an IrDA stack, and a Port Resource.

6. An apparatus as in claim 1 wherein said DCE has protocol layers comprising an IrCOMM layer, an IrDA stack, and a Port Resource.

7. A method of enabling a fax modem (DCE), having a local IrCOMM, to request a certain kind of mode from a PC, having a virtual data port (DTE) and a remote IrCOMM, with which said fax modem communicates when the fax class is made active, comprising the steps of:

indicating to the local IrCOMM, in the DCE, the type of the software flow control, either local or end-to-end, to be applied to software flowing when the fax class is made active; and causing the local and the remote IrCOMM to function in the following manner:

IF an XON/XOFF character is received from the client AND the mode is end-to-end AND the SW flow control is enabled, THEN the XON/XOFF character is handled as flow control and the character is transmitted to the host IrCOMM.

8. The method of claim 7 further comprising providing an interface primitive at the interface of the IrCOMM at the DCE to request the desired mode, said primitive comprising:

IrCOMM_SW_flow_control_mode_set(local or end-to-end).

9. The method of claim 8 further comprising the steps of:

when the desired mode is "local", not transmitting the XON/XOFF characters the host system when SW flow control is active; and when the desired mode is "end-to-end", transmitting the XON/XOFF characters to the host system regardless of the software flow control state.

10. The method of claim 8 further comprising the step of:

providing a control channel parameter inside the local IrCOMM indicating a change of the SW flow control mode to report the change to the host IrCOMM.

11. The method of claim 7 wherein said DTE is provided with protocol layers comprising a fax application layer, an IrCOMM layer, an IrDA stack, and a Port Resource.

12. The method of claim 7 wherein said DCE is provided with protocol layers comprising an IrCOMM layer, an IrDA stack, and a Port Resource.

* * * * *